US011076629B2

(12) United States Patent
Kunes et al.

(10) Patent No.: US 11,076,629 B2
(45) Date of Patent: Aug. 3, 2021

(54) SHELL FORM AND METHOD OF USE (71) Applicants: Lupe Jean Kunes, Ventura, CA (US); Robert John Kunes, Ventura, CA (US)

(72) Inventors: Lupe Jean Kunes, Ventura, CA (US); Robert John Kunes, Ventura, CA (US)

(73) Assignee: MI TACO STAND, LLC, Ventura, CA (US)

(*) Notice: Subject to any disclaimer, the term of this patent is extended or adjusted under 35 U.S.C. 154(b) by 338 days.

(21) Appl. No.: 16/120,365

(22) Filed: Sep. 3, 2018

(65) Prior Publication Data

US 2020/0068942 A1    Mar. 5, 2020

(51) Int. Cl.
| | |
|---|---|
| *A47J 37/12* | (2006.01) |
| *A23P 20/20* | (2016.01) |
| *A21C 9/00* | (2006.01) |
| *A23L 5/10* | (2016.01) |
| *A21D 13/42* | (2017.01) |
| *A23P 30/10* | (2016.01) |
| *A23P 10/10* | (2016.01) |
| *A47J 37/10* | (2006.01) |
| *A21B 5/08* | (2006.01) |

(52) U.S. Cl.
CPC .............. *A23P 20/20* (2016.08); *A21C 9/00* (2013.01); *A21D 13/42* (2017.01); *A23L 5/11* (2016.08); *A23P 10/10* (2016.08); *A23P 30/10* (2016.08); *A47J 37/108* (2013.01); *A47J 37/1214* (2013.01); *A47J 37/1271* (2013.01); *A47J 37/1295* (2013.01); *A21B 5/08* (2013.01); *A23V 2002/00* (2013.01)

(58) Field of Classification Search
CPC . A23P 20/20; A23P 30/10; A21C 9/00; A23L 5/11–5/12; A21D 13/42; A21D 13/33; A21D 13/43; A21B 5/08; A23V 2002/00; A47J 37/1214; A47J 37/108; A47J 37/1271; A47J 37/1295
USPC ............................ 99/426–442; 426/438–441
See application file for complete search history.

(56) References Cited

U.S. PATENT DOCUMENTS

| | | | | |
|---|---|---|---|---|
| 1,718,624 | A * | 6/1929 | Baker ................. | A47J 37/1295 99/450 |
| 2,332,117 | A * | 10/1943 | Shepherd .............. | A47J 37/108 99/355 |
| 2,635,528 | A * | 4/1953 | Torres ................. | A47J 37/1295 99/413 |
| 2,664,812 | A * | 1/1954 | Gilberto .............. | A47J 37/1295 249/120 |
| 2,740,349 | A * | 4/1956 | De Gonia ........... | A47J 37/1295 99/426 |
| 2,847,933 | A * | 8/1958 | Pate ........................ | A47J 43/18 249/117 |
| 3,020,826 | A * | 2/1962 | Silva ................... | A47J 37/1295 99/426 |
| 3,332,340 | A * | 7/1967 | Wirtz ................. | A47J 37/1295 99/426 |
| 3,511,172 | A * | 5/1970 | Jones ..................... | A47J 43/18 249/120 |
| 3,537,389 | A * | 11/1970 | Villarreal ............ | A47J 37/1295 99/427 |

(Continued)

*Primary Examiner* — Drew E Becker
(74) *Attorney, Agent, or Firm* — Paul D. Chancellor; Ocean Law (57) ABSTRACT

A shell form and a method of using the shell form requires a wire form and a wire clip, a tortilla placed therebetween during the time that the tortilla is cooked in hot oil forming a taco shell.

12 Claims, 5 Drawing Sheets

(56) References Cited

U.S. PATENT DOCUMENTS

| | | | | |
|---|---|---|---|---|
| 4,517,887 | A | * | 5/1985 | Childress ............ A47J 37/1295 99/426 |
| 4,535,688 | A | * | 8/1985 | Bentson .............. A47J 37/1295 425/398 |
| 5,072,664 | A | * | 12/1991 | Tienor ................ A47J 37/1295 99/353 |
| D411,413 | S | * | 6/1999 | Pfingsten ........................ D7/504 |
| D620,752 | S | * | 8/2010 | Daniels .......................... D7/504 |
| 9,186,021 | B1 | * | 11/2015 | Dover ................ A47J 37/1295 |
| 2006/0147587 | A1 | * | 7/2006 | Kovich ................ A21C 15/025 426/138 |
| 2013/0224363 | A1 | * | 8/2013 | Kent ...................... A21D 13/60 426/560 |
| 2016/0037783 | A1 | * | 2/2016 | Drees ................ A47J 37/1295 99/393 |
| 2021/0022350 | A1 | * | 1/2021 | Osborn ................ A21C 15/025 |

* cited by examiner

SHELL FORM AND METHOD OF USE

BACKGROUND OF THE INVENTION

Field of the Invention

The invention relates to the field of culinary arts devices. More particularly, the present invention relates to a shell form and a method of using the shell form such as a method of using the shell form to cook a taco shell.

Discussion of the Related Art

In the culinary arts, various tool categories are available for preparing foods including tools for mixing starting ingredients, tools for manipulating intermediate products, and tools for forming or shaping semi-final products. Within the category of tools intended for forming or shaping semifinal products, tools include those used to provide a particular product form or shape such as: a cake pan to contain a batter that produces baked cake-like shape; a form or mold for containing a product that is to be frozen; and extrusion tools for providing elongated forms or shapes that may be cooked without containers.

Exemplary containers that are impervious may be used to cook a semi-final product and to impart shape to the cooked product. Less well known are specialty tools that form and impart a shape to the product during cooking using a pervious container. For example, wire baskets are common pervious containers but they do not impart shape to the cooked product.

And, among these specialty tools, those intended for use in hot, wet environments are rare. They exist primarily in large automated food processing systems. For example, Pringles® potato chips are produced in a large automated food processing system where shape is simultaneously imparted to multiple chips by a rolling mold that mates with the chips as they travel through the fryer.

Small batch cooking of doughs, such as flour and corn-based doughs including shells and taco shells, presents a problem of final product shape. As is explained in the description of the invention below, when a shell is produced without a form, as in a wire basket, the cooked shell shape is unpredictable and random. When a shell is cooked without a form but subsequently placed over a curved form when just removed from the oil, shell shape can again be irregular due, for example, to relaxation away from the curved form. Use of a form during cooking again produces an irregularly shaped shell due, for example, to heated form deformation, opening of the shell while cooking in the hot oil, and relaxation away from the curved form when the form and shell are moved from the hot oil.

SUMMARY OF THE INVENTION

An inventive shell form and method of use and an embodiment comprising: an inner form and an outer clip for capturing a tortilla therebetween. It be noted that in some embodiments a tortilla cooked using the form described herein becomes a taco shell.

In an embodiment: the inner form is made from a planar grill bent along two bend lines to form a "U" shaped structure; the grill made from a single piece of grill wire bent to form two substantially closed loops with a series of open loops therebetween; the grill loops having ends that lie along the perimeter of a circle and the open loops having substantially parallel sides; the outer clip made from a clip loop bent along two bend lines to form a "U" shaped structure; the clip loop made from a single piece of clip wire bent to form a substantially closed clip loop; the clip loop having opposed curved sides and opposed straight sides; and, one of the clip loop flat sides formed at the overlap of opposed ends of the wire; wherein a tortilla wrapped around the inner form and held there by the outer clip is ready for cooking.

Applicant notes that a taco shell starts off as a tortilla. When cooked, the tortilla may become the shell used in making a taco.

DETAILED DESCRIPTION OF THE PREFERRED EMBODIMENTS

The disclosure provided in the following pages describes examples of some embodiments of the invention. The designs, figures and description are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention.

FIGS. 1-8 show portions of the invention, embodiments of the invention, and uses of the invention 100, 200, 300, 400, 500, 600, 700, 800.

Figure 1:
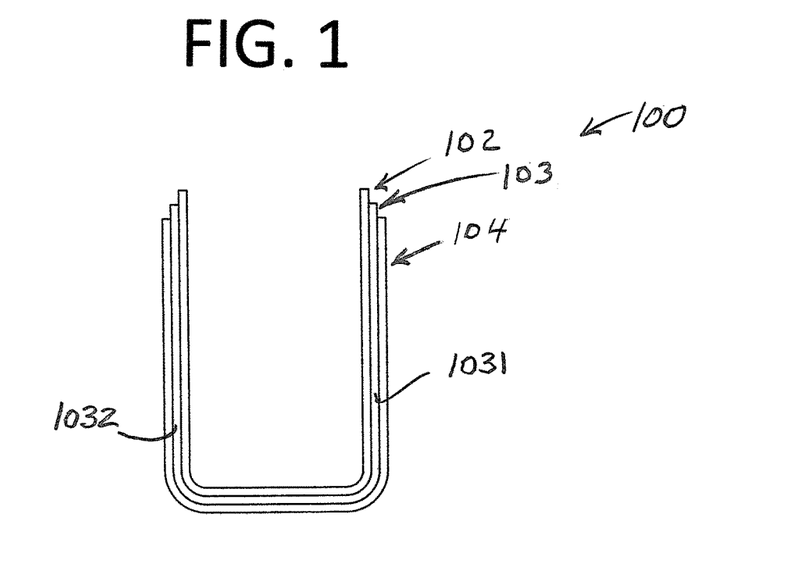
FIG. 1 shows and end view of a shell form assembly in accordance with the present invention.

FIG. 1 shows an end view of an embodiment of the invention in use 100. Here, the assembly includes a shell such as a taco shell 103 between an inner form 102 and an outer clip 104.

The inner form 102 is a pervious structure. For example, the inner form may be made of metal such that holes exist therein. For example the inner form may be made of wire that forms a grid or grill. For example the inner form may be made of a single length of wire bent so as to make a grid or grill. For example the inner form may be made from wire bent to form a planar structure. The planar structure may be bent again to form a "U" shape.

In various embodiments the inner form 102 may be made from wire such as wire of a diameter of about 0.0937 inch, wire made from stainless steel, and/or wire made from spring steel.

The outer clip 104 is a pervious structure. For example, the outer clip may be made of metal such that holes exist therein. For example the outer clip form may be made of wire that forms a hoop. For example the outer clip may be made of a single length of wire bent to form a hoop. For example the outer clip may be made from single length of wire bent in a planar hoop and bent again to form a "U" shape.

In various embodiments the outer clip 104 may be made from wire such as wire of a diameter of about 0.0265 inch, wire made from stainless steel, and/or wire made from spring steel. This wire diameter is smaller than the wire diameter of the inner form and because of this the spring constant of the outer "U" (outer clip) 104 is less than the spring constant of the inner "U" (inner form) 102 which reduces and or eliminates the deformation of the inner form resulting from the outer clip tending to compress the inner form when the shell form 100 is assembled with a tortilla.

Applicant notes that the above use of a wire form 102 and a wire clip tends to maximize the area of the tortilla available for contact with a hot cooking oil since wire minimizes the area of the tortilla that is covered by the assembly 102/104. Applicant refers to this design as an "open" design which may be accomplished by using wire or another suitable framework of members that tends to minimize the area of the tortilla that is covered by the assembly.

Figure 2:
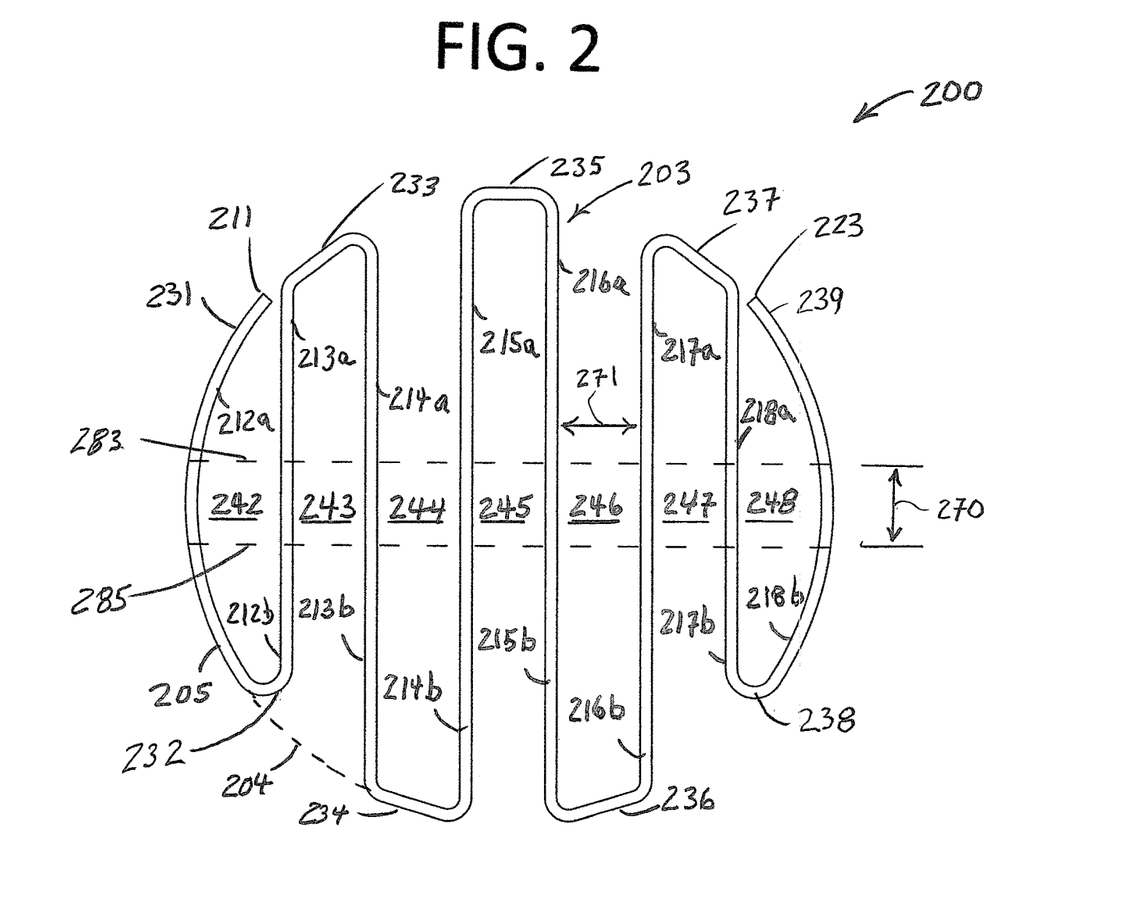
FIG. 2 shows a planar grill for use in connection with the shell form assembly of FIG. 1.

FIG. 2 shows a planar grill 200 that is the inner form 102 before it is shaped into a "U". The planar grill includes wire 205 that is bent into a series of undulating waves 203 to form the grill which reaches across a somewhat circular space 204.

In the example shown, the waves 203 form seven loops 242-248 with the loops at opposing ends of the grill 242, 248 being closed or nearly closed by virtue of the ends of these loops 211, 223 (eg. ends of the wire forming the grill) being curved to touch or almost touch the adjacent loops 242, 248. In other embodiments, more or less than seven loops may be used. For example 4-6 or 8-12 loops may be used.

Embodiments of the grill 200 include structures with loops. For example, a structure may have a series of upstanding loops where a leftmost or first loop 242 includes left and right sides 212a, b and upper and lower ends 231, 232; a rightmost or last loop 248 includes left and right sides 218a,b and upper and lower ends 239, 238; and, between these loops are open loops 243, 244, 245, 246, 247. Loop 243 may include sides 213a, b and upper end 233. Loop 244 may include sides 214a, b and lower end 234. Loop 245 may include sides 215a, b and upper end 235. Loop 246 may include sides 216a, b and lower end 236. Loop 247 may include sides 217a, b and upper end 237. In various embodiments, the loop ends 233-237 lie along the perimeter of the afore mentioned circle 204. In various embodiments the loop ends 231, 232, 238, 239 lie along the perimeter of the afore mentioned circle 204. In various embodiments, the loop ends 233-237 lie near the perimeter of the afore mentioned circle 204. In various embodiments the loop ends 231, 232, 238, 239 lie near the perimeter of the afore mentioned circle 204. And, in various embodiments the loops 243-247 have open ends opposite the ends 233-237.

Figure 3:
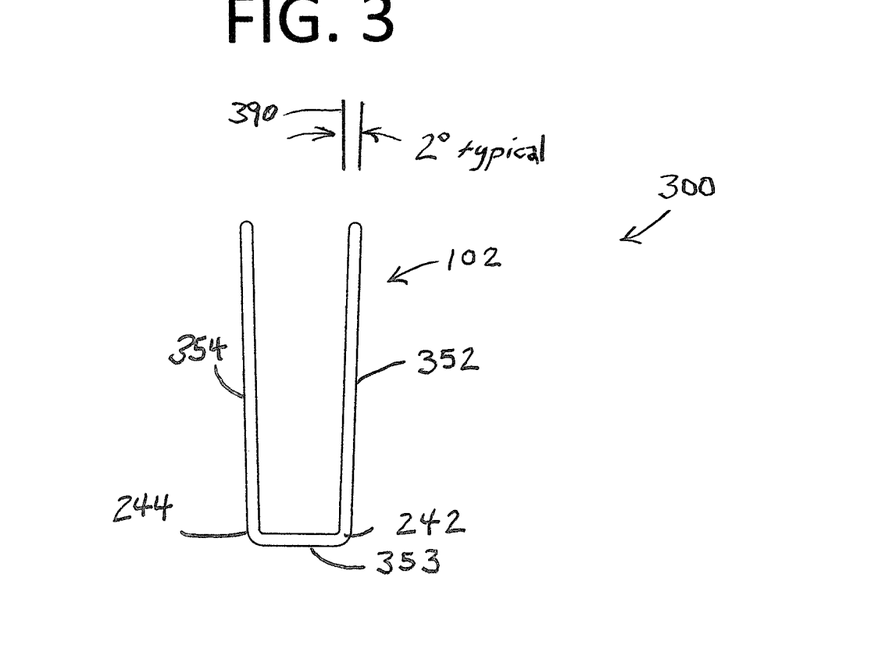
FIG. 3 shows an end view of a bent planar grill for use in connection with the shell form assembly of FIG. 1.

As mentioned above, grill 200 is bent to form a "U" shape when viewed from the end and as shown 300 in FIG. 3. Notably, when viewed from the side the grill has the shape of a half moon 400 as shown in FIG. 4.

Figure 4:
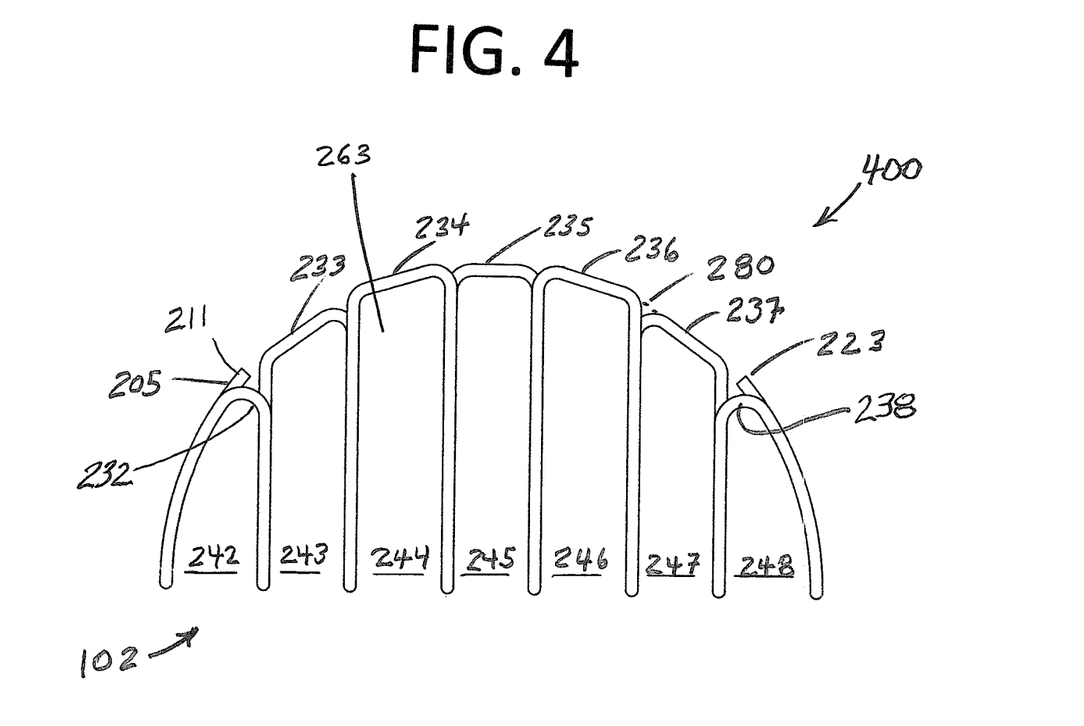
FIG. 4 shows a side view of an inner form for use in connection with the shell form assembly of FIG. 1.

For example, when the opposite ends of the grill 212a, 218b are brought near each other (see FIG. 3) such that the grill is deformed along bend lines 242, 244, the grill is transformed into the inner form 102 with a "U" shaped end view seen in FIG. 3 and a half moon shaped side view seen in FIG. 4.

In various embodiments, the circular outline of the inner form before it is bent into a "U" shape 200 may have a diameter of about six inches. And in various embodiments, the inside/outside radiuses of the wire bends forming the loops 242-248 may be about ¼ inch and 13/64 inch. And in various embodiments, the distance 270 between the bend lines 283, 285 may be about 0.75 inches which will make a "U" shaped shell with an opening of 0.75 inches less twice the thickness of the shell, the opening for receiving shell filling. And in various embodiments, the loops may have a width of about 0.75 inches measured perpendicular to the afore mentioned distance between the bend lines 271.

FIG. 3 shows the "U" shaped end view 300 of the inner form 102. Visible in this view are upstanding and opposed wings 352, 354 and a central body 353 that meets the wings 352, 354 at the bend lines 283, 285. In some embodiments, the wings are bent away from the vertical 390. For example, the wings may be bent away from the vertical by less than ten degrees such that the mouth of the "U" is opened up. In one embodiment, the wings are bent about two degrees from the vertical.

FIG. 4 shows the half-moon shaped side view 400 of the inner form 102. Visible in this view are upstanding loop portions of loops 242-248. Also visible in this view are free ends 211, 223 of the wire 205 used in making the inner form 102, end loops 242, 248 and in between loops 243-247. The ends of the in between loops 233-237 are, in this side view, adjacent to one another and lying along the perimeter 280 of the half moon.

The apparently adjacent ends of the in between loops may in reality be staggered such that they fall alternately along the perimeters of coincident semi circles lying in parallel and spaced apart planes.

Figure 5:
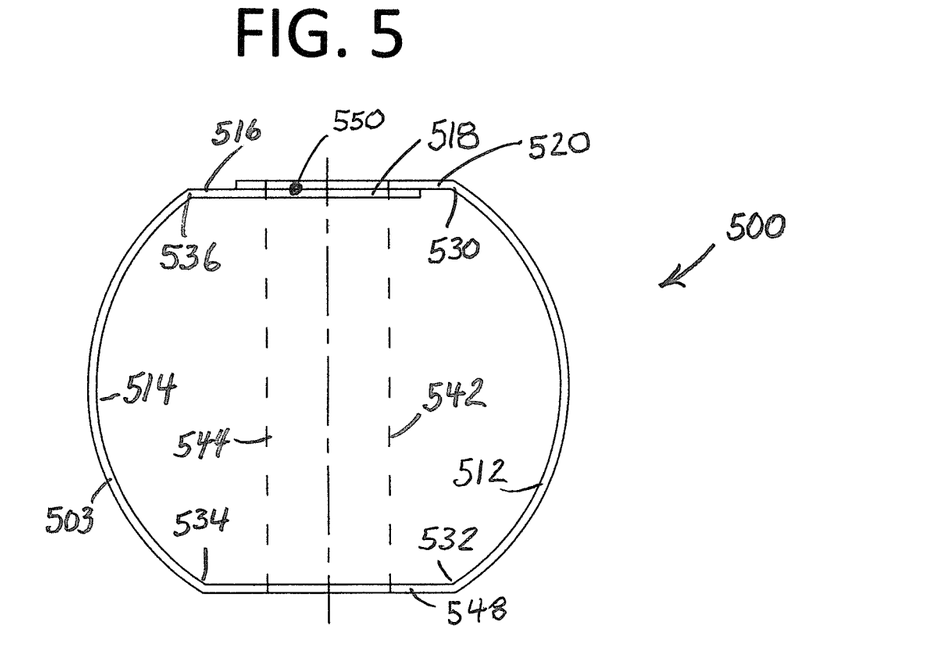
FIG. 5 shows a hoop of an outer clip for use in connection with the shell form assembly of FIG. 1.

FIG. 5 shows a hoop 500 used to make an outer clip 104. The hoop may be made from a single length of wire 503 that forms a planar loop. In an example, the hoop has opposed curved sides 512, 514 and opposed straight sides 516, 548. The straight side 516 may be formed at or near the overlap of opposite ends 518, 520 of the wire. The curved side 512 adjoins the flat sides at bends 530 and 532 while the curved side 514 adjoins the flat sides at bends 534 and 536. The curved side 512 adjoins the flat sides at bends 537 and 538. In some embodiments a weld or other fastener/fixture 550 may be used.

In various embodiments, the hoop curved sides 512, 514 have a radius of about two inches measured from the center of the hoop. In various embodiments, the flat sides of the hoop have a length of about 2.5 inches. In various embodiments, the distance between the bend lines used to form the hoop into a "U" shape 542, 544 is about one inch.

Figure 6:
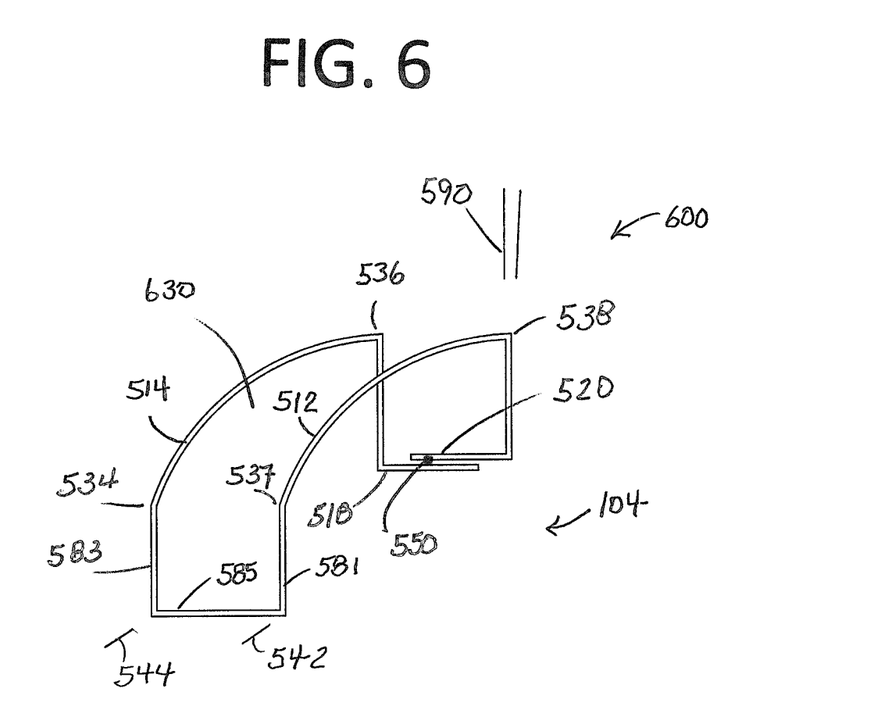
FIG. 6 shows a perspective view of an outer clip for use in connection with the shell form assembly of FIG. 1.

FIG. 6 shows the perspective view of the hoop 600. Here, the hoop may be bent along bend lines 542, 544 such that the end view is "U" shaped and the side view is shaped like a half moon or a partial half-moon (as shown). Visible in the end view are upstanding and opposed wings 581, 583 and a central body 585 that meets the wings at the bend lines 542, 544. In some embodiments, the wings are bent away from the vertical 690. For example, the wings may be bent away from the vertical by less than ten degrees such that the mouth of the "U" is opened up. In one embodiment, the wings are bent about two degrees from the vertical.

Figure 7:
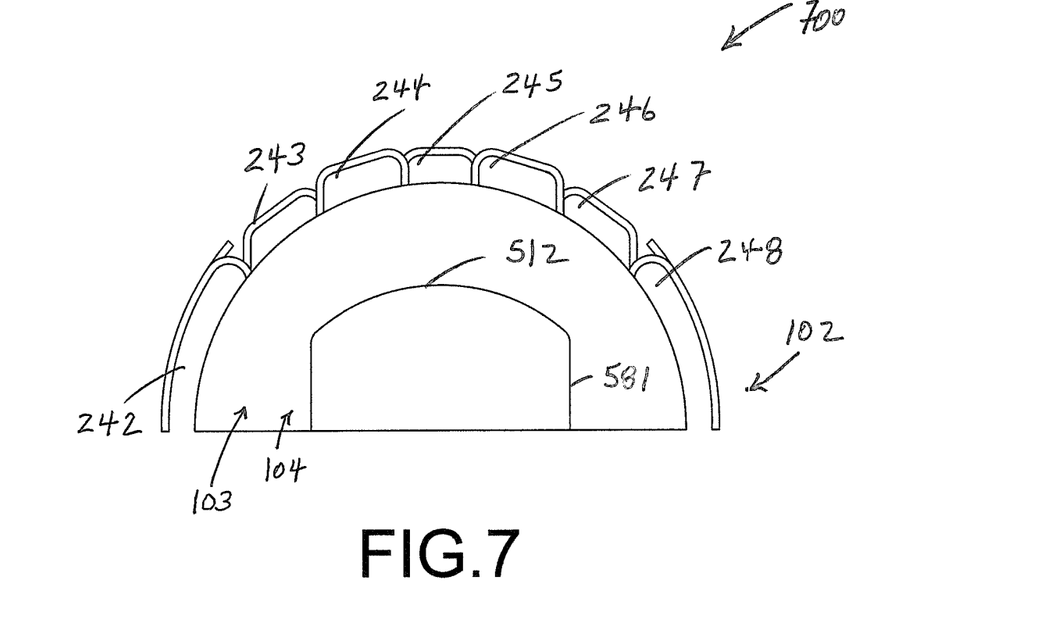
FIG. 7 shows a side view of a shell form assembly for use in connection with the shell form assembly of FIG. 1.

FIG. 7 shows a side view of an embodiment the invention in use 700. Here, the assembly includes a tortilla such as a taco shell 103 between an inner form 102 and an outer clip 104.

As shown, the inner form loop ends 242-248 may be located between the flaps 1031, 1032 (see FIG. 1) of a tortilla wrapped around the inner form 102. As seen, the inner form loop ends 242-248 may extend beyond the flaps of the folded tortilla.

In various embodiments the outer clip 104 is designed to press the tortilla shell near or against the inner form 102. The clip may also press the tortilla into the inner form's interstitial spaces 263.

In various embodiments, the central body 353 of the form 102 may be flat or curved or "V" shaped. Where the central body is flat as may be shown by a flat bottom, this allows the tortilla to be formed while cooking to provide a flat bottom shape. The clip may also assist in forming a shaped bottom. For example, a clip bottom may be flat as shown for example in the flat central body 585 of the clip of FIG. 6.

Where a taco shell with a flat bottom is desired, the tortilla 103 may be held by the shell form 102 with a flat central body 353 and outer clip 104 which may have a flat central body 585 such that a flat bottom is formed. For example, this arrangement may allow the taco shell to stand upright during cooking 700. For example, after removal of the clip and form, a flat bottom taco shell allows for filling the taco shell more easily as the taco shell stands upright presenting an open and upright taco shell mouth for filling.

Figure 8:
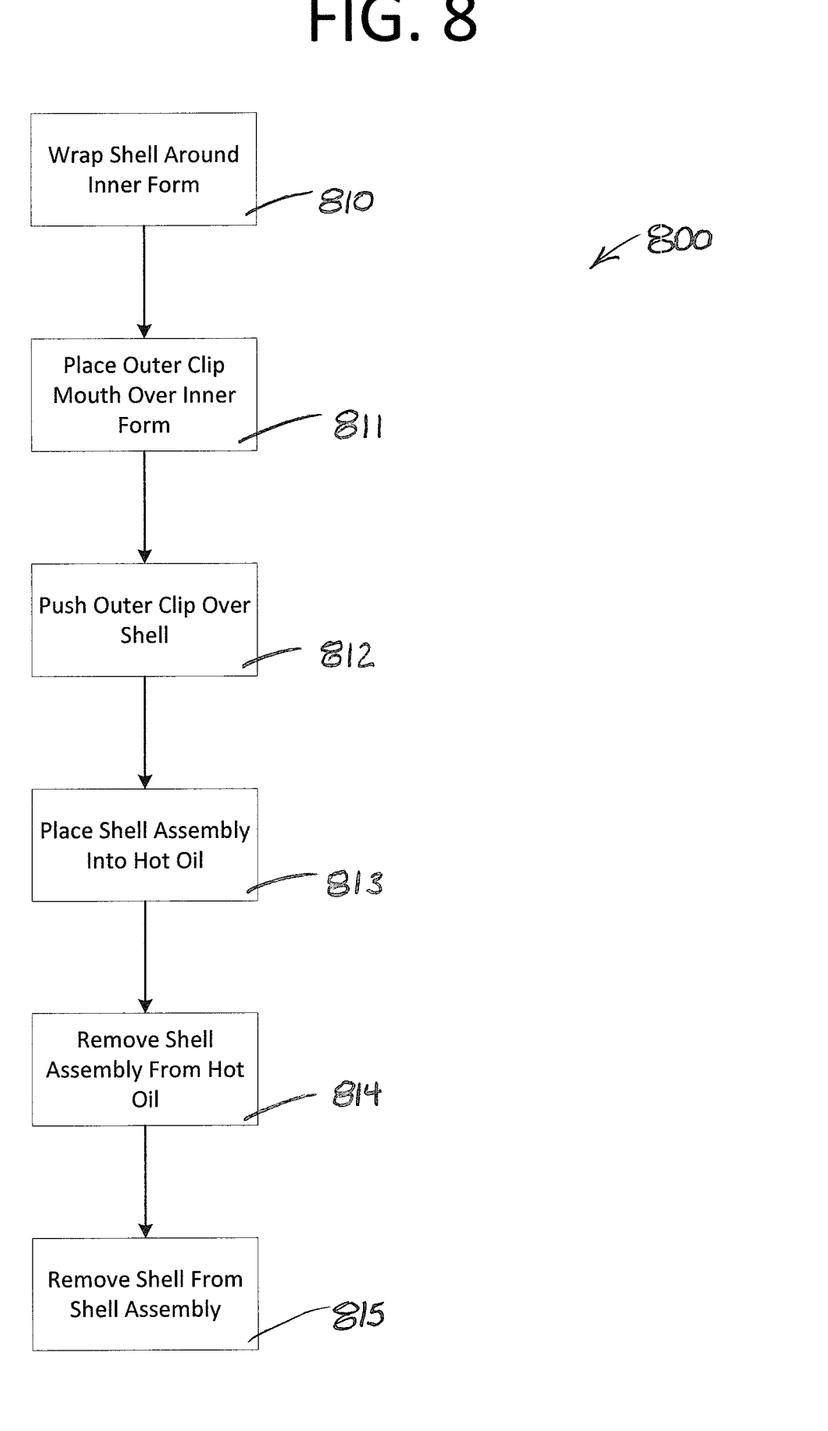
FIG. 8 shows a process of using the shell form assembly of FIG. 1.

As seen in FIG. 8, use of the inventive device includes the following steps 800 in the order given: in a first step 810, wrapping the tortilla around the inner form wings 352, 354 and central base 353; in a second step 811, placing the outer clip mouth 630 over the inner form central base; in a third step 812, pushing the outer clip over the tortilla until the outer clip central body 585 is close to the inner form central body 353 with the tortilla therebetween; in a fourth step 813, placing the assembly 700 into hot oil to cook; in a fifth step 814, removing the assembly from the hot oil; and, in a sixth step 815, removing the cooked taco shell from the taco shell assembly.

The inner form 102 is a pervious structure. For example, the inner form may be made of metal such that holes exist therein. For example, the inner form may be made of wire that forms a grid or grill. For example, the inner form may be made of a single length of wire bent so as to make a grid or grill. For example the inner form may be made from wire bent to form a planar structure. The planar structure may be bent again to form a "U" shape.

The outer clip 104 is a pervious structure. For example, the outer clip may be made of metal such that holes exist therein. For example, the outer clip form may be made of wire that forms a hoop. For example, the outer clip may be made of a single length of wire bent to form a hoop. For example, the outer clip may be made from single length of wire bent in a planar hoop and bent again to form a "U" shape.

While various embodiments of the present invention have been described above, it should be understood that they are presented by way of example only, and not limitation. It will be apparent to those skilled in the art that various changes in the form and details can be made without departing from the spirit and scope of the invention. As such, the breadth and scope of the present invention should not be limited by the above-described exemplary embodiments but should be defined only in accordance with the following claims and equivalents thereof.

What is claimed is:

1. A taco shell form comprising:
   an inner form disconnected from an outer clip for capturing a tortilla therebetween;
   the inner form made from a planar grill bent along two bend lines to form a "U" shaped structure;
   the planar grill made from a single piece of wire bent to form two substantially closed loops with a series of open loops therebetween without welding;
   the closed loops having ends that lie along the perimeter of a circle and the open loops having substantially parallel sides;
   the outer clip made from a planar loop bent along two bend lines to form a "U" shaped structure;
   the planar loop made from a single piece of wire bent to form a substantially closed loop;
   the planar loop having opposed curved sides and opposed straight sides; and,
   one of the planar loop straight sides formed at the overlap of opposed ends of the wire;
   wherein a peripheral skirt of a tortilla inserted in the assembled taco shell form lies in a space between an outer edge of the inner form and an outer edge of the outer clip.

2. The taco shell form of claim 1 wherein the substantially closed loops include wire free ends that, if extended, intersect.

3. The taco shell form of claim 1 wherein sides of the closed loops lie substantially along the perimeter of the circle.

4. The taco shell form of claim 1 wherein the perimeter of the planar grill is substantially in the form of a circle.

5. The taco shell form of claim 4 wherein the bend lines are about 0.75 inches apart.

6. The taco shell form of claim 5 wherein the opposed sides of the closed loops are about 0.75 inches plus or minus 0.2 inches apart.

7. A method of using a shell assembly to cook a taco shell comprising the steps of:
   providing an inner form disconnected from an outer clip, the outer clip with a clip mouth for capturing a tortilla therebetween;
   the inner form made by bending a planar grill along two lines to form a "U" shaped structure, the grill made from a single piece of wire bent to form two substantially closed loops with a series of open loops therebetween, the closed loops having ends that lie along the perimeter of a circle and the open loops having substantially parallel sides; and,
   the outer clip made by bending a clip loop along two bend lines to form a "U" shaped structure, the clip loop made from a single piece of wire bent to form a substantially closed clip loop, the clip loop having opposed curved sides and opposed straight sides, one of the clip loop straight sides formed at the overlap of opposed ends of the wire;
   wherein a tortilla is prepared when the taco shell is wrapped around the inner form, the outer clip mouth is placed over the inner form, the outer clip is pushed over the tortilla, the shell assembly is placed into cooking oil, the shell assembly is removed from cooking oil, and the shell is removed from the shell assembly.

8. The method of claim 7 wherein the substantially closed loops include wire free ends that, if extended, intersect.

9. The method of claim 7 wherein the sides of the closed loops lie substantially along the perimeter of the circle.

10. The method of claim 7 wherein the bend lines are about 0.75 inches apart.

11. The method of claim 7 wherein the opposed sides of the closed loops are about 0.75 inches plus or minus 0.2 inches apart.

12. An assembly holding a tortilla therebetween comprising:

an inner form having a U shape with a flat bottom and an outer clip having a U shape with a flat bottom, the inner form and outer clip having no connection therebetween;

the inner form made from planar grill wherein a single wire forms multiple open loops between first and second closed loops;

the outer clip made from a single wire loop with overlapping ends;

the outer clip defining first and second vertical planes when resting on its flat bottom;

at least one of the vertical planes having a semicircular apex and straight sides for capturing a tortilla between the assembled inner form and the outer clip;

multiple vertical portions of the inner form wire opposite and extending beyond the first vertical plane and multiple vertical portions of the inner form wire opposite and extending beyond the second vertical plane; and, the tortilla covers part of the inner form and the clip covers part of the tortilla such that part of the tortilla lies between the semicircular apex of the outer clip and a broken semicircular perimeter formed by loops of the inner form.

\* \* \* \* \*